(12) United States Patent
Richter et al.

(10) Patent No.: US 8,757,245 B2
(45) Date of Patent: Jun. 24, 2014

(54) VEHICLE AIR CONDITIONER

(75) Inventors: Gerald Richter, Aachen (DE); Jürgen Hoppen, Köln (DE); Mario Opiela, Aachen (DE)

(73) Assignee: Halla Visteon Climate Control Corporation, Daejeon-Si (KR)

( * ) Notice: Subject to any disclaimer, the term of this patent is extended or adjusted under 35 U.S.C. 154(b) by 1383 days.

(21) Appl. No.: 12/501,149

(22) Filed: Jul. 10, 2009

(65) Prior Publication Data

US 2010/0006258 A1  Jan. 14, 2010

(30) Foreign Application Priority Data

Jul. 10, 2008  (DE) .................. 10 2008 040 338

(51) Int. Cl.
*B60H 3/00* (2006.01)

(52) U.S. Cl.
USPC ............. 165/42; 165/41; 165/202; 165/139

(58) Field of Classification Search
USPC ................. 165/42, 61, 41, 139, 202
See application file for complete search history.

(56) References Cited

U.S. PATENT DOCUMENTS

| | | | | |
|---|---|---|---|---|
| 5,062,473 A * | 11/1991 | Ostrand et al. | ................... | 165/42 |
| 5,154,223 A | 10/1992 | Ishimaru et al. | | |
| 5,218,998 A * | 6/1993 | Bakken et al. | ........... | 137/625.28 |
| 5,878,806 A * | 3/1999 | Denk et al. | ................... | 165/42 |
| 6,305,462 B1 * | 10/2001 | Tsurushima et al. | ........... | 165/43 |
| 6,508,703 B1 * | 1/2003 | Uemura et al. | ................ | 454/156 |
| 6,622,787 B1 * | 9/2003 | Toyoshima et al. | ........... | 165/203 |
| 6,659,167 B2 * | 12/2003 | Tsurushima et al. | ........... | 165/43 |
| 6,736,190 B2 * | 5/2004 | Natsume et al. | ................ | 165/42 |
| 6,814,137 B2 * | 11/2004 | Tsurushima et al. | ........ | 165/202 |
| 7,189,158 B2 * | 3/2007 | Motszko et al. | .............. | 454/143 |
| 7,285,041 B2 * | 10/2007 | Yoshida et al. | ................ | 454/143 |
| 7,527,551 B2 * | 5/2009 | Goupil et al. | ................ | 454/121 |
| 7,540,321 B2 * | 6/2009 | Simmet et al. | ................ | 165/203 |
| 7,546,868 B2 * | 6/2009 | Klein et al. | .................... | 165/203 |
| 7,625,273 B2 * | 12/2009 | Komowski | .................... | 454/121 |
| 7,794,314 B2 * | 9/2010 | Sekiya et al. | ................. | 454/334 |
| 7,931,074 B2 * | 4/2011 | Itou | ............................... | 165/202 |
| 8,113,268 B2 * | 2/2012 | Stevenson | ........................ | 165/42 |
| 2002/0084058 A1 * | 7/2002 | Ozeki et al. | ...................... | 165/42 |
| 2005/0227606 A1 * | 10/2005 | Oide | ............................ | 454/108 |
| 2005/0263277 A1 * | 12/2005 | Kim | ............................ | 165/203 |
| 2006/0042778 A1 * | 3/2006 | Stevenson | ........................ | 165/41 |
| 2007/0077879 A1 * | 4/2007 | Marshall et al. | .............. | 454/121 |
| 2007/0137833 A1 * | 6/2007 | Kang et al. | ...................... | 165/42 |
| 2007/0184774 A1 * | 8/2007 | Balzo et al. | .................... | 454/143 |

FOREIGN PATENT DOCUMENTS

| | | | |
|---|---|---|---|
| DE | 3813116 A1 | 10/1989 | |
| DE | 4141450 A1 | 7/1992 | |
| DE | 4119474 A1 | 12/1992 | |
| DE | 19603944 C1 | 2/1997 | |
| DE | 69820990 T2 | 6/2004 | |
| EP | 1336517 A1 | 8/2003 | |
| EP | 1832450 A1 | 9/2007 | |
| FR | 2878469 A1 | 6/2006 | |

* cited by examiner

*Primary Examiner* — Marc Norman
*Assistant Examiner* — Devon Russell
(74) *Attorney, Agent, or Firm* — Fraser Clemens Martin & Miller LLC; J. Douglas Miller

(57) ABSTRACT

A vehicle air conditioner is disclosed having means to cool and heat air with three air paths, of which, two outer air paths have a common first temperature and an inner air path has a second temperature, wherein a means for controlling the air volume flow through the outer air paths and the inner air path is provided by two control elements which are configured jointly to be able to move in opposing directions.

15 Claims, 7 Drawing Sheets

VEHICLE AIR CONDITIONER

CROSS-REFERENCE TO RELATED APPLICATION

This application claims the benefit of German Pat. Appl. Ser. No. DE 102008040338.5 filed Jul. 10, 2008, hereby incorporated herein by reference in its entirety.

FIELD OF THE INVENTION

The invention relates to an air conditioner for air conditioning of motor vehicles. Such air conditioners are used in motor vehicles to air-condition the passenger compartment and make available a pleasant atmosphere in the vehicle for vehicle occupants.

BACKGROUND OF THE INVENTION

Modern vehicle air conditioners must meet a multiplicity of requirements. Some of the requirements are contradictory. For example, small dimensions of the components with high flow-through of air, as well as good temperature distribution and control at low costs.

A solution for the requirement of high flow-through of air and a very good temperature distribution are known from DE 10 2007 014 835.8. There, a system with a heating heat exchanger with a cold air passage is described. This system makes it possible to achieve a direct and detachment-free flow with good temperature distribution into the various air outlets. The temperature is controlled by means of a slider element or a combination of slider elements and a turning flap centrally placed.

A disadvantage in use of a single slider element is the structural space required. The slider flap requires a pocket in the housing so that the asymmetry of the heating heat exchanger with a symmetric flap is compensated for.

Owing to the geometry of the system, and especially of the slider, the air flow is disadvantageously affected. In an intermediate setting of the slider, only a small part of the cross section is opened or closed. Due to this, the air flow continuously shifts within the individual cross sections. Optimized mixing and a specific air guidance are largely prevented thereby.

The combination of a slider element and turning flap centrally located has led first to an increased structural space required, and secondly the distance between the heating heat exchanger and the slider element in the intermediate settings is small. This has a disadvantageous effect on air guidance through the heating heat exchanger, and thereby on mixing. Owing to the two structurally different elements, with this technical solution, expensive coupling systems are necessary, through which cost disadvantages arise.

An additional technical solution for an optimal temperature control consists in using three turning flaps, with one each placed before the heating heat exchanger elements as well as one before the cold-air passage. By this means the temperature is very well controlled, though with considerable structural space needed and design expense owing to the flap couplings. What is additionally disadvantageous is that in the individual end settings like "coldest" at which the air flows only through the cold-air passage, or "warmest" at which the air only flows through the two heating heat exchanger elements, the flaps guiding the air flow are positioned in the air flow. Owing to this, there is an increased flow resistance, also called system counterpressure, which can have a negative effect on the acoustics of the system.

From DE 698 20 990 T2, a flap actuator device for the air conditioner of a motor vehicle is known, which divides the air flow into two streams, and is driven via a toothed wheel and a toothed wheelwork on the flap corresponding to the toothed wheel.

What is disadvantageous with this configuration is that the air flow can only be divided into two streams, and that the system counterpressure is relatively high. Added to this is that the requirements for a temperature-layered flow of modern air conditioners are not met.

SUMMARY OF THE INVENTION

The goal of the present invention is to make available a temperature control system which has good air guidance at low system counterpressure, as well as with low structural space requirements and low costs.

The invention is solved owing to a vehicle air conditioner with means to cool and heat the air which has three air paths, of which two outer air paths have a joint first temperature and an inner air path has a second temperature. As a means for controlling the air volume flow through the outer and the inner air path, two control elements are provided, which are configured to be able to move in opposite directions.

The vehicle air conditioner for heating and cooling air comprises a first outer air path with air flowing at a first temperature; a second outer air path with air flowing at the first temperature; a first inner air path with air flowing at a second temperature; a first control element controlling at least one of the air flowing in the first outer air path, the second outer air path, and the first inner air path; and a second control element controlling at least one of the air flowing in the first outer air path, the second outer air path, and the first inner air path, wherein the first control element and the second control element are configured jointly to be able to move in opposing directions.

According to a first embodiment of the invention, the three air paths are formed by a heating heat exchanger, which consists of two heating heat transmission elements, between which a cold air passage is placed as the inner air path. Through the two heating heat exchanger elements run the outer air paths, which according to this embodiment of the invention guide warm air.

According to a second embodiment of the invention, the three air paths are formed by guiding the inner air path through a heating heat exchanger, which is surrounded on both sides by cold air paths, which form the upper and lower air path.

One configuration form of the first embodiment of the invention has, as control elements, two flaps, which preferably are configured as swiveling flaps. These are so placed that each in the one end setting cover a part of the heat exchanger and the cold air passage, or release the cold air passage. In the other end setting, the two flaps are positioned before the cold air passage and seal it off, and release the two heating heat exchanger elements.

The flaps run from the one end setting to the other in opposite directions. While doing so they are kinematically coupled. In the "warmest" end setting, i.e., with the cold air passage covered, the flap elements seal against each other. To improve the controlling properties, the flap elements can be moved behind each other or seal one another. In a preferred embodiment form, the two swiveling flaps have differing dimensions or radii, which are adjusted to the heat exchanger paths or the controlling requirements.

It is especially advantageous if the control elements are configured as slider elements that can move to each other in differing planes and are embodied so as to move behind each other in the air flow direction.

According to an advantageous embodiment of the invention, the slider elements have a toothed bar, and are configured so they can be driven by a driving toothed ring corresponding with it.

What is understood by sliding elements are control elements that are moved via a driving toothed wheel and a toothed bar connected with the slider elements. Thus, the slider elements follow the form of the toothed bar as they move.

What is understood by swiveling flaps are control elements that move about a pivot point that lies outside the plane of the flap. The pivoting flaps move in a circular arc in the particular distance from the pivot point.

One advantageous embodiment of the invention is seen in that a central driving toothed wheel is provided.

The driving toothed wheel, according to a further embodiment of the invention, is configured as a co-axial dual toothed wheel with differing numbers of teeth, and a driving toothed wheel of the dual toothed wheel is assigned to each toothed bar of the slider element.

The movement properties of the slider elements are especially smooth, if each slider element preferably on the side has two toothed bars placed at a distance from each other, and the corresponding driving toothed wheels are placed at a distance to each other on a shaft.

A further advantageous embodiment of the invention consists in an air passage formed in the interval of planes of the slider elements between the slider elements. True, this air passage is only effective if the slider elements are not in the end positions. The air volume flow of the air passage between the slider elements, which are not found in the central end position, then flows through the inner air path.

A further development of the invention consists in one of the two slider elements having a sealing element, which closes and seals the inner or central air path in an end setting of the slider element.

One advantageous alternative to that consists in a configuration of the invention when two slider elements have sealing elements, which in one end setting of the slider elements jointly close and seal the air passage between the two slider elements and the inner or central air path.

The slider elements themselves preferably are configured as plates with curved surfaces. Independent of the curvature of the sliding elements, they are advantageously equipped with curved toothed bars.

One advantageous embodiment of the invention consists in configuring the slider elements and the toothed bars to be curved with opposing orientation.

One especial advantage of the invention is that the slider elements and the toothed bars are configured so that by means of the motion of the slider elements, the temperature can be adjusted in linear fashion.

The concept of the invention consists in the problem being solved by two counter-running plate elements, that in one end setting cover the heating heat exchanger elements and in another end setting close the cold air passage. By this means, in each of the end settings, one air path is completely opened.

The elements for controlling the air flow are preferably configured as slider elements. They run in differing paths and differing planes. According to the concept, the elements are driven by a drive shaft with toothed wheels via toothed bars. The toothed bars are connected to the slider elements. By arranging the elements to both sides of the toothed wheel, counter-running directions of movement are engendered for the slider elements.

The slider elements are guided in lateral guides in the housing. According to a preferred embodiment, the guides are configured as sections of a circle with differing radii that are placed co-axial. Owing to this, identical virtual pivoting points are engendered for the two sliding elements.

In one end setting, the heating heat exchanger elements are sealed by the two slider elements. For this, on the slider elements there are flexible sealing components, which seal opposite on sealing flanges attached to the housing.

According to a preferred first embodiment of the invention, in the "warmest" end setting, the slider elements are moved behind each other in their differing paths, to attain full closure of them with two slider elements and only one cold air passage. With this, only one slider element seals the cold air passage, and in this setting the other element stands before the sealing element with no further sealing function.

In the intermediate settings of the slider elements, air flows are engendered by the heating heat exchanger elements above or below the slider elements. In essence the cold air is guided through between the two elements. If the elements, as depicted in the preferred embodiment, move behind one another, the air must flow through the gap produced. The contour on the rear side of the elements is exploited to set a defined gap between the two slider elements, which serves to make the air conditioner able to be regulated. The gap between the two slider elements is also designated as the cold-air passage.

The contour of the slider elements is so configured that in the "coolest" setting, in which the slider elements are positioned before the two heating heat exchanger elements, a nozzle-shaped constriction or structure results in the cold-air passage. By this means, the system counterpressure is considerably lessened, and the cold air flow is guided at low resistance to the cold-air passage and through same.

The slider elements move on curved paths which allow the air flow to fan out on the back side of the element, and thus a larger area of the corresponding heating heat exchanger element is used. According to the concept, by this means the flow resistance of the overall system vis-à-vis the localization to reduced flow-through areas of the heat exchanger is lessened.

To simplify installation of the two slider elements into the system, they are pre-mounted in a frame together with the drive shaft.

In an alternative embodiment, the curved paths are offset. They are no longer placed coaxially and in addition have differing radii. The virtual pivot points of the slider elements lie rather at markedly differing points. By this means, there arises a larger degree of freedom in the configuration of the system in relation to system counterpressure and controllability. Differing motion paths can also be attained, so that a given structural space can specifically be used. The goal is to ensure an identical air mass flow distribution between the individual heating heat exchanger elements in the entire movement path.

To obtain differing movement paths, according to an advantageous embodiment of the invention, toothed wheels with differing numbers of teeth are mounted coaxially next to each other on the drive shaft. A toothed wheel or a pair of toothed wheels is assigned to the toothed bar or bars of each slider element, so that the slider elements are driven with differing toothed wheels, and thus differing movement paths. Thus a first toothed while drives a first sliding element and a second toothed wheel drives a second sliding element.

The dimensions of the sliding elements, as well as the arrangement of the guides are so executed that the center of the cold air flow which results in the individual intermediate settings in the cold-air passage, lies at a constant position, in order to attain a constant temperature mixing in the system. This alternative embodiment of the invention causes the two slider elements to move together. Through this, the slider elements seal against each other. Therefore, the elements are provided with flexible sealing elements, which seal the two heating heat exchanger elements against the housing in the one end setting. In the second end setting, each flexible sealing element of a sliding element seals against the housing as well as a second flexible sealing element of the one flap on the second flap.

In the second "warmest" end setting the sliding elements only move partially behind one another, i.e. not fully. The gap between the flaps is used via a suitable contouring of the sliding elements for adjusting the temperature controls.

The invention-specific solution has various advantages.

The arrangement of the slider elements makes possible low-loss and detachment-free flow paths with low system counterpressure. In both end settings of the system, no attaching parts are in the flow paths, thus making the efficiency of the system even higher.

Temperature mixing and control can be specifically set owing to the contour of the elements. By the arrangement and the contour of the sliding element guides, the cold air path is constantly impinged on by flow. By this means, a constant mixing is attained in the system.

Through differing paths and dimensions of the slider elements, a constant air mass flow division to the two heating heat exchanger elements can be ensured.

Owing to the compact design of the temperature control system, a smaller structural space requirement is attained for the air conditioner. The smaller number of components as well as the geometry of the system make possible lower costs through simpler controls.

BRIEF DESCRIPTION OF THE DRAWINGS

Further particulars, features and advantages of the invention can be gleaned from the following description of embodiment examples with reference to the pertinent drawings. Shown are.

DETAILED DESCRIPTION OF THE INVENTION

Figure 1:
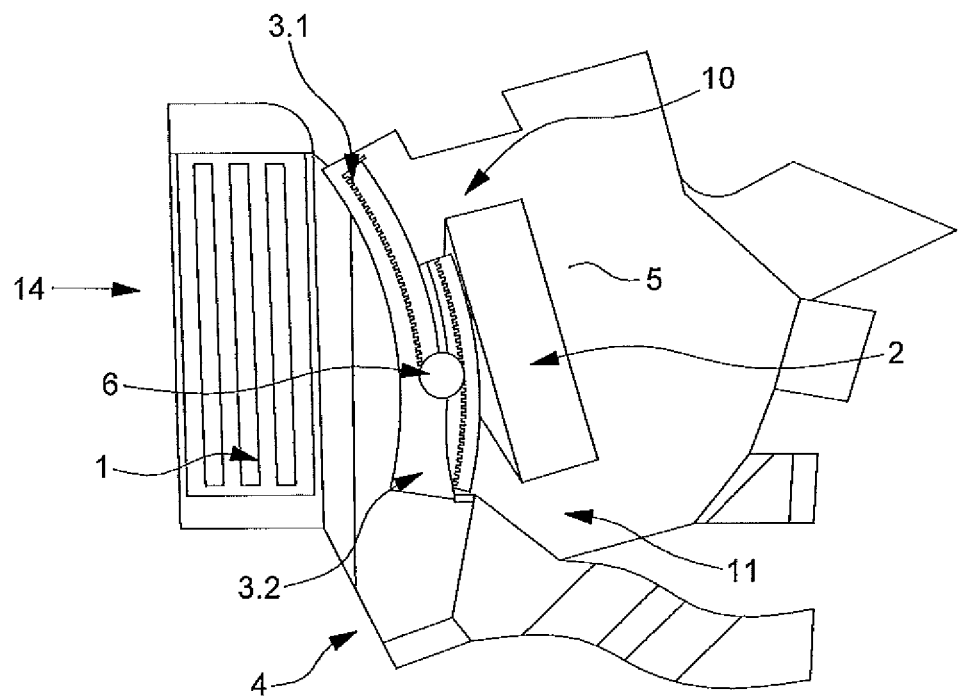
FIG. 1: vehicle air conditioner with inner warm air path and outer cold air path in center cross section.

In FIG. 1, a vehicle air conditioner in a center cross-section is depicted. This facility in essence consists, in the air flow direction 14, of a vaporizer 1 as well as a heating heat exchanger 2 in a housing 4. The central heating heat exchanger 2 is limited above and below by air paths 10, 11 as cold-air passages, while in contrast, the inner air path 5 with warm air is conducted through heating heat exchanger 2. The temperature is controlled by slider elements 3.1, 3.2, which are moved simultaneously and in opposing directions by means of a driving toothed wheel 6. In the end setting shown, the slider elements 3.1, 3.2 stand in front of the air paths or cold air passages 10, 11, in the second end setting, not shown, in front of the heating heat exchanger 2.

Figure 2:
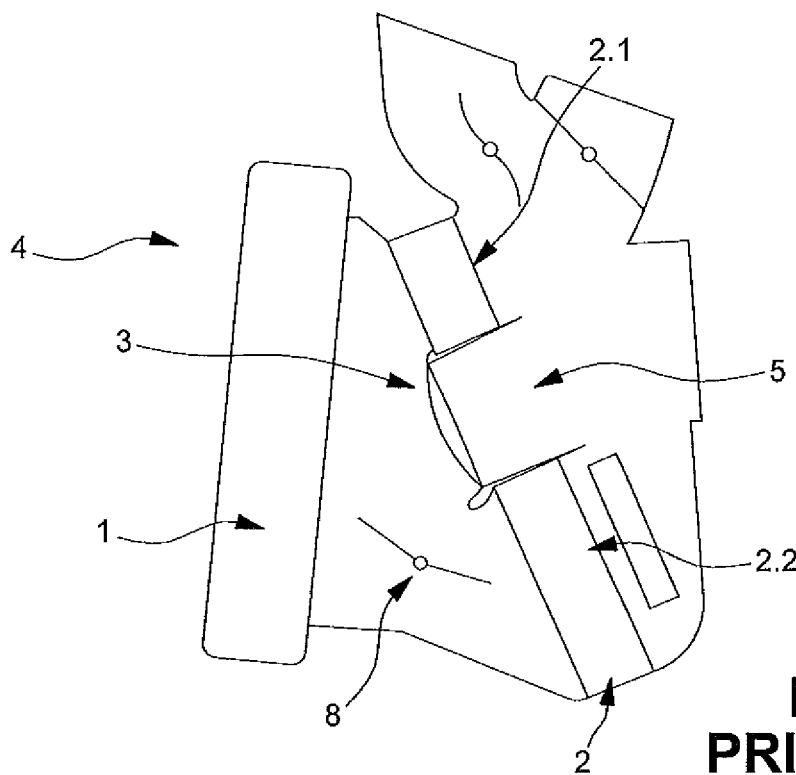
FIG. 2: state of the art: controller with slider element and turning flap.
Figure 3:
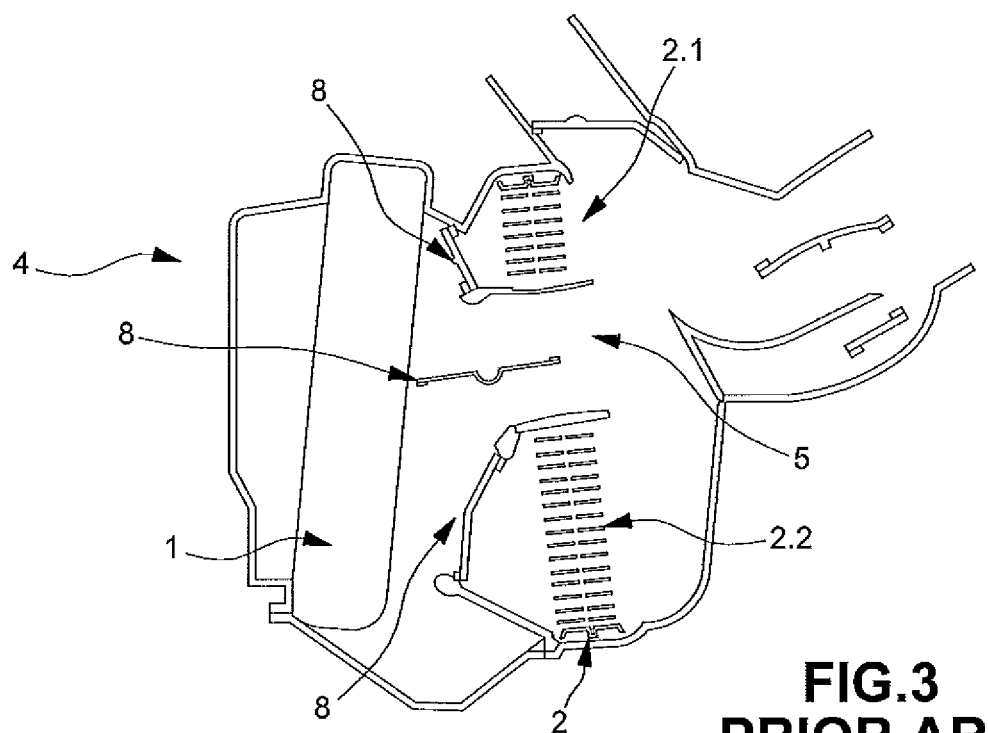
FIG. 3: state of the art: controller with three turning flaps.

FIGS. 2 and 3 show temperature control systems according to the state of the art for air conditioners with a heating heat exchanger 2 with a cold-air passage as an inner air path 5 and with one upper heating heat exchanger 2.1 and one lower heating heat exchanger element 2.2 with the outer air paths 10, 11. Multiple control elements 3 in the form of flap elements 8 and slider elements are placed in housing 4, to implement a control of the air volume flow. This leads to an increased structural space requirement as well as to complex couplings between the various components, which represents a cost disadvantage.

Figure 4:
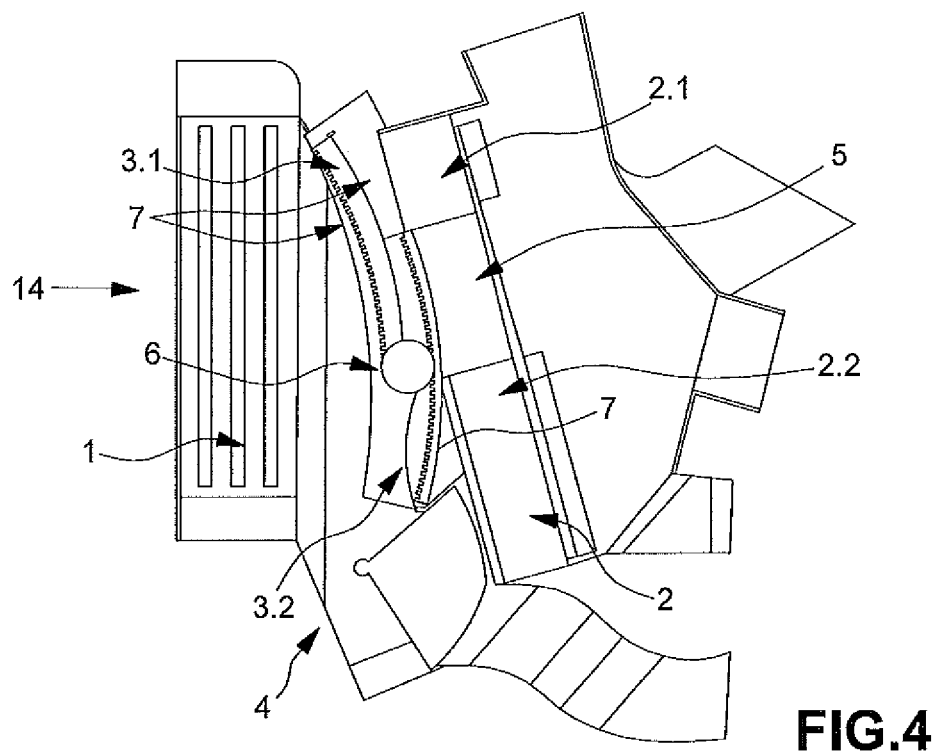
FIG. 4: diagram of a vehicle air conditioner in cross section.

In FIG. 4, an invention-specific version of a vehicle air conditioner is shown schematically in cross section. Between vaporizer 1 and heating heat exchanger 2, two slider elements 3.1, 3.2 are positioned. In the cross-sectional depiction, these elements 3.1, 3.2 are placed to either side of a drive shaft with the driving toothed wheel 6 and move in lateral guides 7 which are placed in housing 4. The guides 7 according to the depicted embodiment form of the invention are configured as arcs of a circle with a common center point and radii of differing size as guide rails 7.

In the lower area of the air conditioning system an additional temperature flap is accommodated for a third temperature zone.

Air flows in flow direction 14 through vaporizer 1, and encounters slider elements 3.1, 3.2 found in the "coldest" setting, through which the air is guided into the inner air path as a cold-air passage 5. Behind heating heat exchanger 2, with its areas of the upper heating heat exchanger element 2.1, the cold air passage 5 and the lower heating heat exchanger 2.2, the air is distributed to the various receiving entities.

Figure 5:
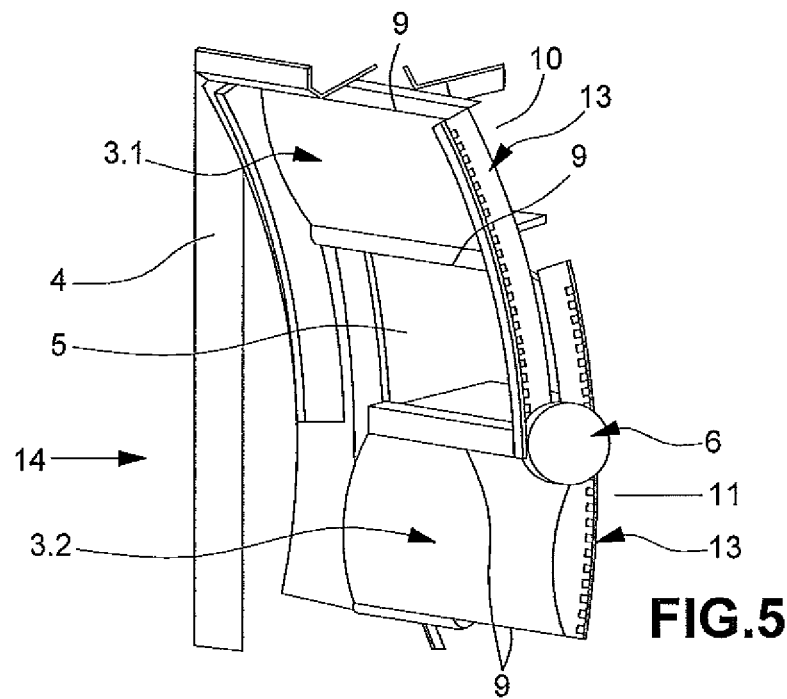
FIG. 5: perspective cutout of a controller with toothed wheel and toothed bar in the "coldest" end setting.

In FIG. 5, in perspective, the temperature control system is depicted with the driving toothed wheel 6 and toothed bar 13 in detail in the so-called "coldest" setting. A first upper slider element 3.1 is placed toward the vaporizer, and a second lower slider element 3.2 is placed toward the heating heat exchanger or heating heat transfer device 2. Between elements 3.1, 3.2 a drive shaft is placed with driving tooth wheels 6 on both sides at the sides of housing 4. The slider elements 3.1, 3.2 are placed between the two toothed bars 13. The toothed bars 13 are each connected with the slider elements 3.1, 3.2, and are in engagement with the driving toothed wheel 6. The slider elements 3.1, 3.2 and the toothed bars 13 are not placed on the same radius, so that a smaller interval is made possible between slider elements 3.1, 3.2 than between the guides 7 or between the toothed bars 13 of the two slider elements 3.1, 3.2. It is especially advantageous if the slider elements 3.1, 3.2 have a curvature opposed to the curvature of the toothed bars 13. By this means, in the setting shown, a nozzle-like, low-flow-resistance guidance of the cold air flow is made possible in the air flow direction 14 through cold air passage 5.

Owing to the arrangement of the slider elements 3.1, 3.2 bilateral to driving toothed wheel 6, when driving toothed wheel 6 is turned, according to the concept, there results a counter-running movement of the toothed bars 13 and of the slider elements 3.1, 3.2 connected with them, so that a very compact and simple actuation results. The number of components needed is advantageously reduced to a minimum.

The measurements of the lower slider element 3.2 match those of the cold-air passage, by which this element, in a first end setting, closes and seals the cold air passage. Simultaneously, the dimensions of the lower slider element 3.2 match those of the lower warm air path 11, and thus those of the lower heating heat exchanger element 2.2. The measurements of the upper slider element 3.1 match those of the upper warm air path 10 to be sealed and of the upper heating heat transfer element 2.1. Thus, in the end settings of the slider elements 3.1, 3.2, either the cold-air passage 5 or the warm-air paths 10, 11 are fully closed.

The two slider elements 3.1, 3.2 are advantageously equipped with flexible sealing elements 9. These seal the two slider elements 3.1, 3.2 in the second end setting, the "warmest" setting, on sealing flanges, not depicted, attached on the housing side.

Figure 6:
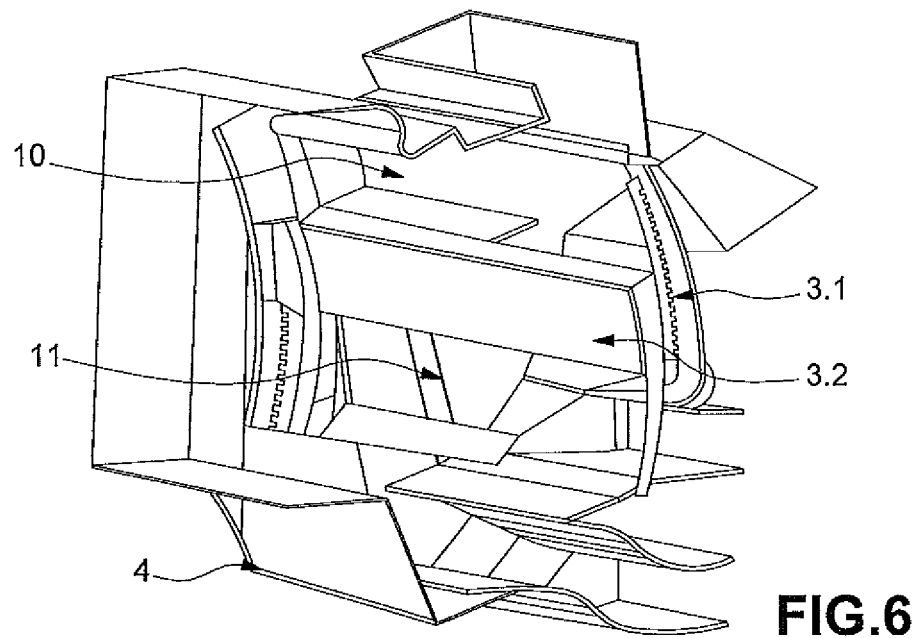
FIG. 6: perspective cutout of the temperature control system in the "warmest" end setting.

The second end setting, the "warmest" setting with a closed cold-air passage, is depicted in FIG. 6. The slider elements 3.1, 3.2 are positioned one behind the other. The warm air paths 10, 11 are fully opened, and the two heating heat transfer elements 2.1, 2.2 are fully impinged on by flow. Owing to the infinitely variable movement of the two slider elements 3.1, 3.2 atop each other, various cross sections between the warm and cold air path are opened or closed.

Figure 7:
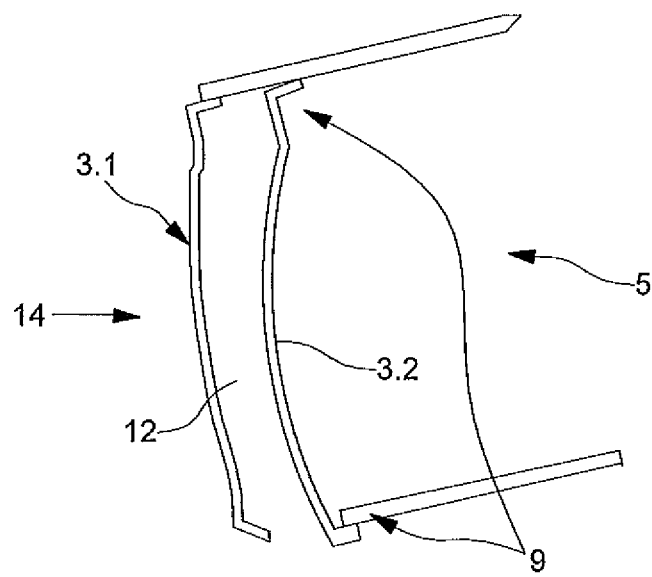
FIG. 7: detail of cold air passage of the temperature control system in the "warmest" end setting.

The second end setting, the "warmest" setting with a closed cold-air passage 5, is again depicted very schematically in FIG. 7. Only the lower slider element 3.2 is sealing the cold-air passage. The upper slider element 3.1 in this setting is in a non-functional placement before the sealing element 3.2 and has no influence on the air flow.

Depicted between the slider elements 3.1, 3.2 is the cold-air passage 12 as a gap, which has no function in the slider setting depicted. Only if the depicted end setting of slider elements 3.1, 3.2 is moved away from, and the cold-air passage 5 is partially released from the lower slider element 3.2, does cold air 14 flow through cold-air gap 12 to cold-air passage 5. Owing to the slider contour, the geometry of gap 12 and thus, of the air mass flow passing through, can be precisely defined and controlled.

Figure 8:
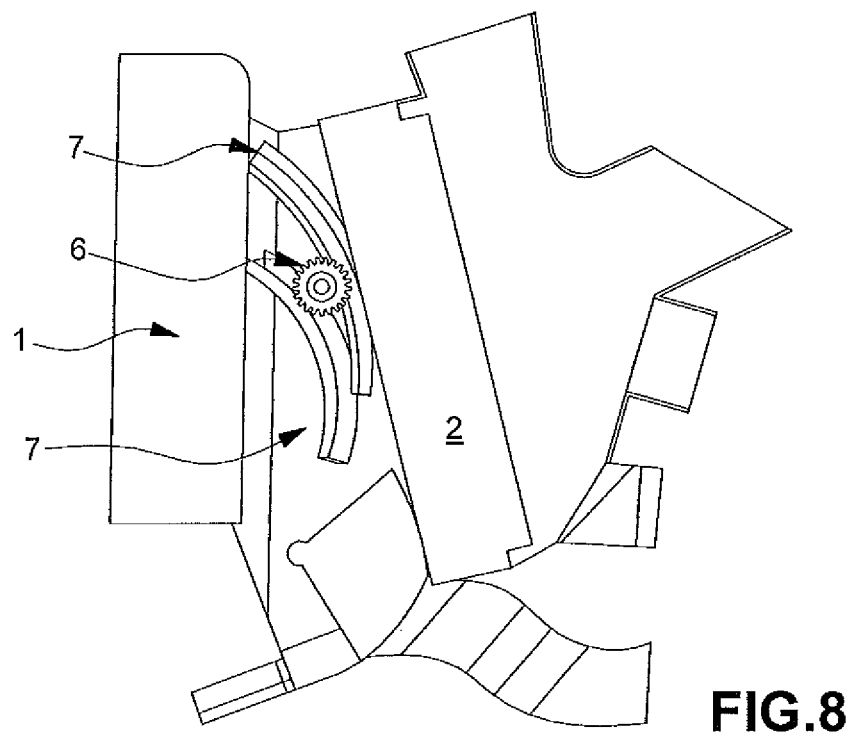
FIG. 8: diagram of a vehicle air conditioner with sharply curved toothed bars.

An alternative invention-specific embodiment form is depicted in FIG. 8. In this embodiment, the guides 7 and the toothed bars 13 are configured as arcs of a circle, which have differing central points and radii. By this means, markedly differing motion paths are engendered for the two slider elements 3.1, 3.2. Also engendered are additional degrees of freedom in the arrangement of the components, as well as in the configuration of air paths 5, 10, 11.

Figure 9:
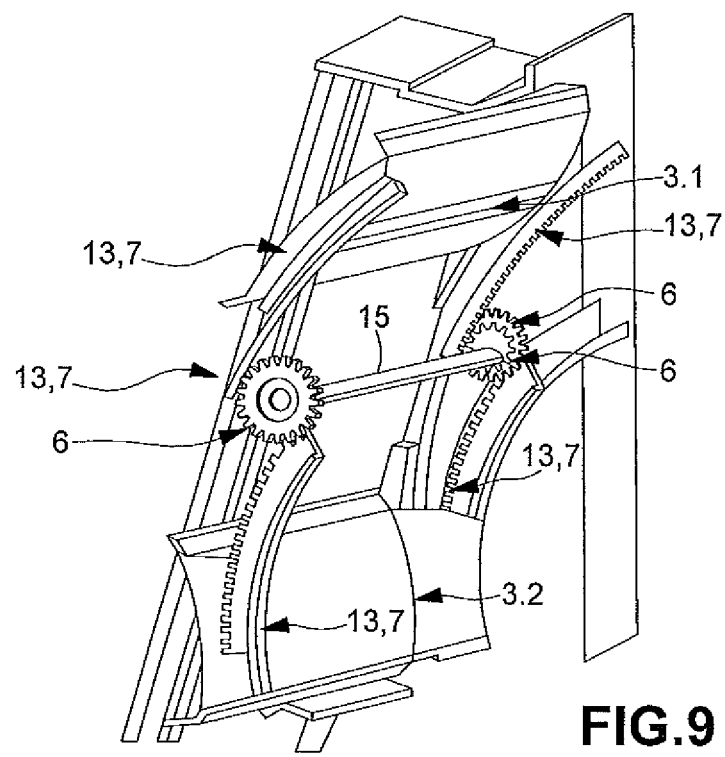
FIG. 9: view of a second preferred embodiment of the control element

In FIG. 9, a further configuration of the drive of the temperature control system is depicted. The drive shaft 15 has two driving toothed wheels 6 on each side with differing diameters. Owing to this, differing motion paths are made possible for the two slider elements 3.1, 3.2. Additionally depicted in FIG. 9 is that slider elements 3.1, 3.2 are not placed directly on the toothed bars 14, but are kept at a distance from them by spacers. What is especially advantageous with this configuration is that the creation of differing driving tooth wheels 6 for driving the differing slider elements 3.1, 3.2, opens up more possibilities for adapting the motion of the individual elements to make the air conditioner linear in its control behavior. Further optimizations of motion arise by creating an interval of toothed bar 13 to slider elements 3.1, 3.2, and by the contours of toothed bar 13 as well as of slider elements 3.1, 3.2 themselves.

Figure 10:
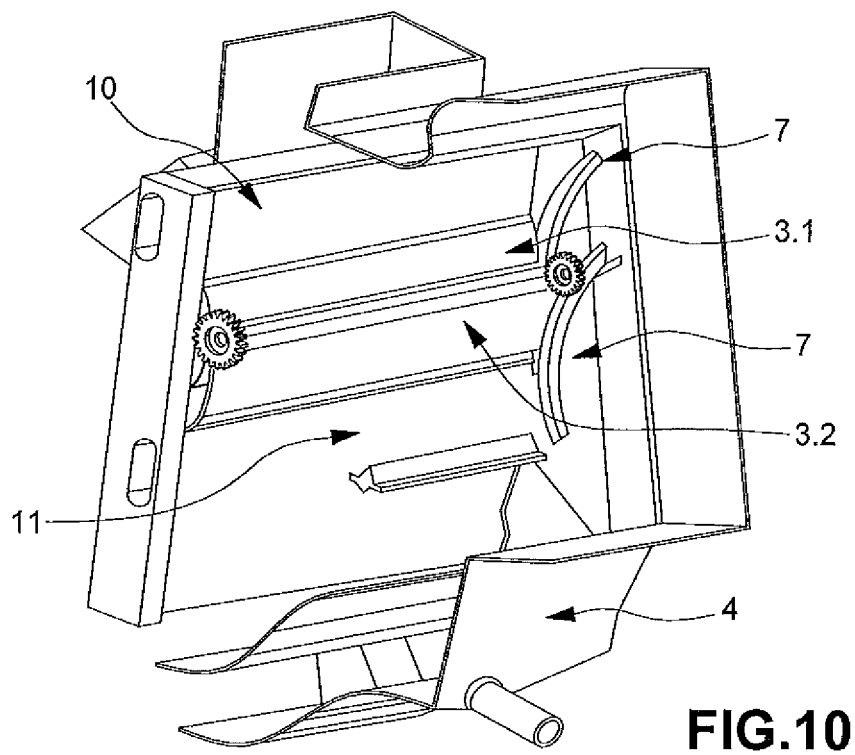
FIG. 10: view of the temperature control system in the "warmest" end setting.
Figure 11:
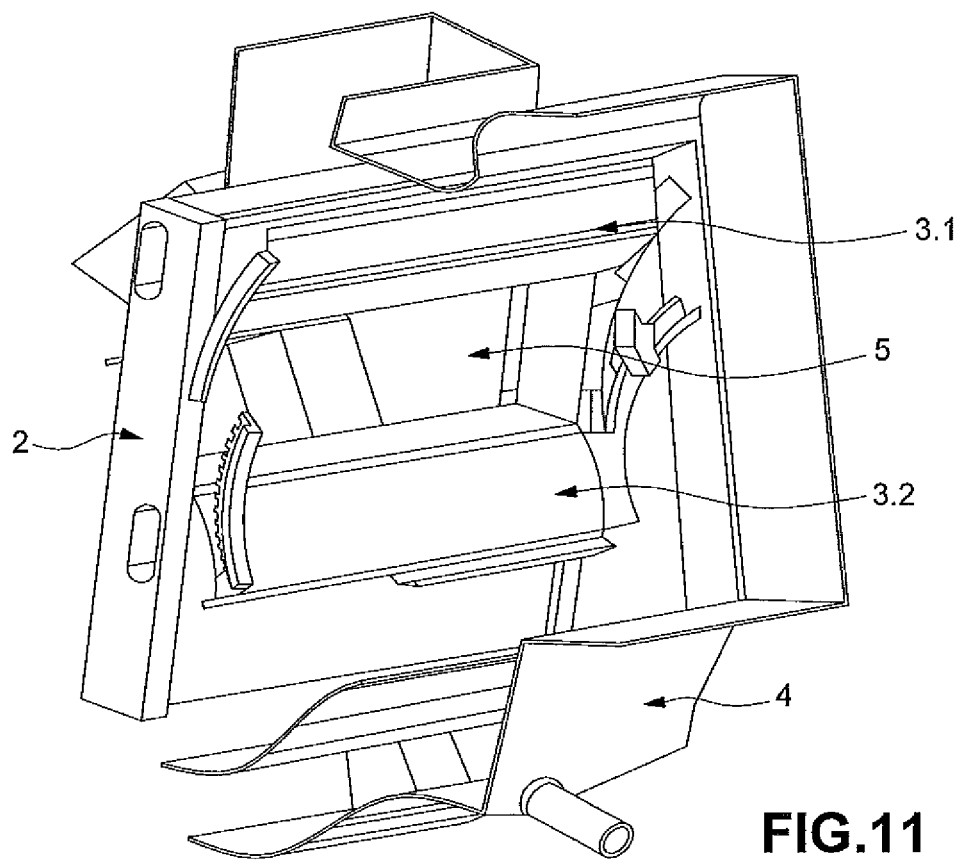
FIG. 11: view of the temperature control system in the "coldest" end setting.

FIGS. 10 and 11 show an alternative embodiment of a temperature control system in the two end settings of the system. In FIG. 10 the "warmest" setting is depicted, and in FIG. 11 the "coldest." In the two end settings, the particular air paths are fully opened, and the complementary air paths are fully closed.

Special features result with this configuration in the "warmest" setting according to FIG. 10. With it, the two slider elements 3.1, 3.2 are given such dimensions that only jointly do they fully close cold-air passage 5.

True, in this setting the two slider elements 3.1, 3.2 essentially are guided in two planes, but not fully placed one behind the other. In an overlap area of sliding elements 3.1, 3.2, they stand in sealing contact with each other and thus, jointly close cold-air passage 5. Thus, smaller slider elements 3.1, 3.2 can be used, since they do not alone need to block off the entire cross section of cold-air passage 5.

Additionally, the impingement of cold-air passage 5 with flow can be optimized through the arrangement shown. Owing to a suitable configuring of the curved paths, the end settings and the element contour, a constant position is obtained of the center of the cold-air flow into the cold-air passage 5 for optimized temperature mixing and layering.

Figure 12:
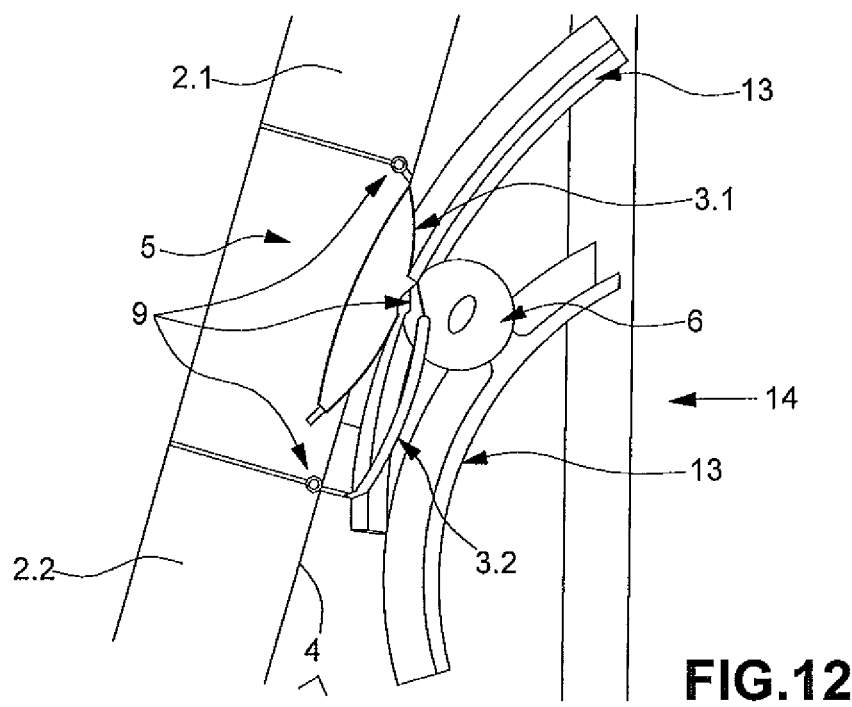
FIG. 12: sealing concept in the "warmest" setting.

In FIG. 12, the end setting of slider elements 3.1, 3.2 from FIG. 10 is shown in detail with a closed cold-air passage 5. The two slider elements 3.1, 3.2 each seal with only one seal 9 against housing 4 on the upper and lower edge of cold-air passage 5, which is limited by upper heating heat transfer element 2.1 and lower heating heat transfer element 2.2. Lower slider element 3.2 seals on its bottom side on the lower area of cold-air passage 5, and upper slider element 3.1 seals on its upper side on the upper area of cold-air passage 5. To achieve a sufficient impermeability in this setting, the two slider elements 3.1, 3.2 are sealed against each other. In doing so, flexible sealing element 9 of second slider element 3.2 is pressed against a slanted sealing surface in the form of a sealing lip or sealing nose, which is placed on first upper slider element 3.1. Through this additional seal, there results a fully sealed cold-air passage 5.

Figure 13:
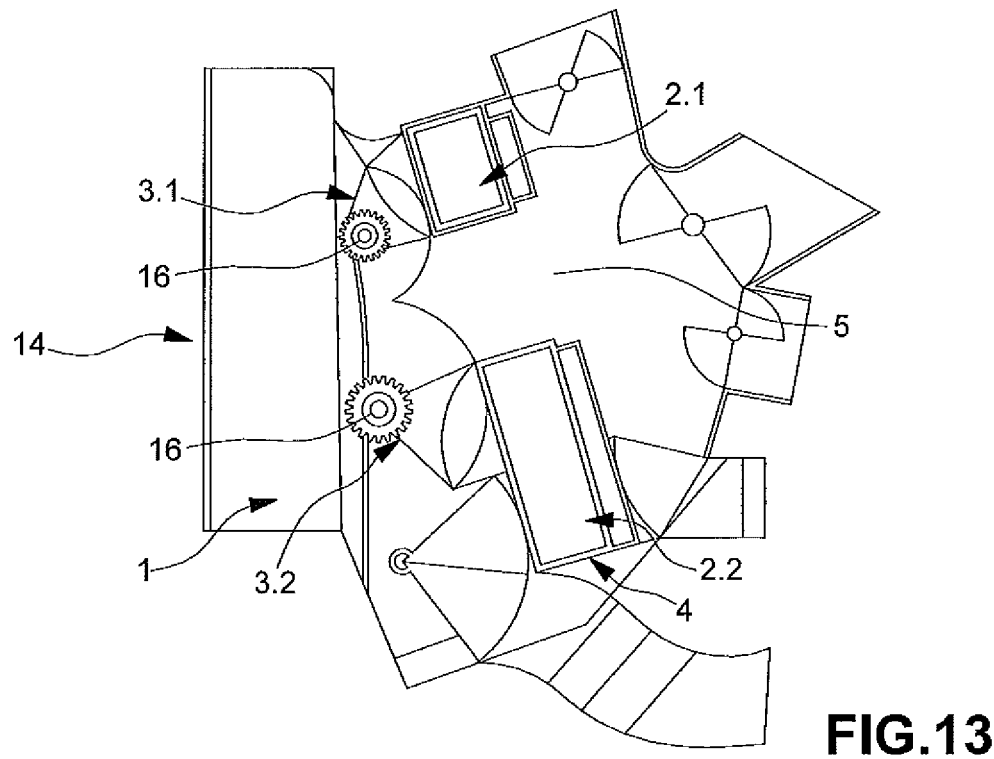
FIG. 13: diagram of a vehicle air conditioner in cross section in the "coldest" end setting.

In FIG. 13, an invention-specific version of a vehicle air conditioner is depicted in schematic cross section. Between evaporator 1 and heating heat exchanger 2, two swiveling flaps 3.1, 3.2 are positioned as alternatives to the slider elements. These elements 3.1, 3.2 are placed one over the other in the cross-sectional depiction and are guided in supports placed in housing 4.

In the lower area of the air conditioning system, an additional temperature flap for a third temperature zone is accommodated.

The air flows in flow direction 14 through evaporator 1 and impinges on swiveling flaps 3.1, 3.2 that are in the "coldest" setting, through which the air in inner air path 5 flows and is guided through the cold-air passage. Behind heating heat exchanger 2, with its areas of upper heating heat transmission element 2.1, inner air path 5 and lower heating heat transmission element 2.2, the air is distributed to the various receiving entities. The two swiveling flaps 3.1, 3.2 turn about pivoting axes 16, which are positioned so that the motions of swiveling flaps 3.1, 3.2, in the second end setting according to FIG. 14, seal as they touch, and thus, close inner air path 5. The motion of swiveling flaps 3.1, 3.2 is mechanically coupled via a drive not depicted, by which joint and opposing motion is attained.

Figure 14:
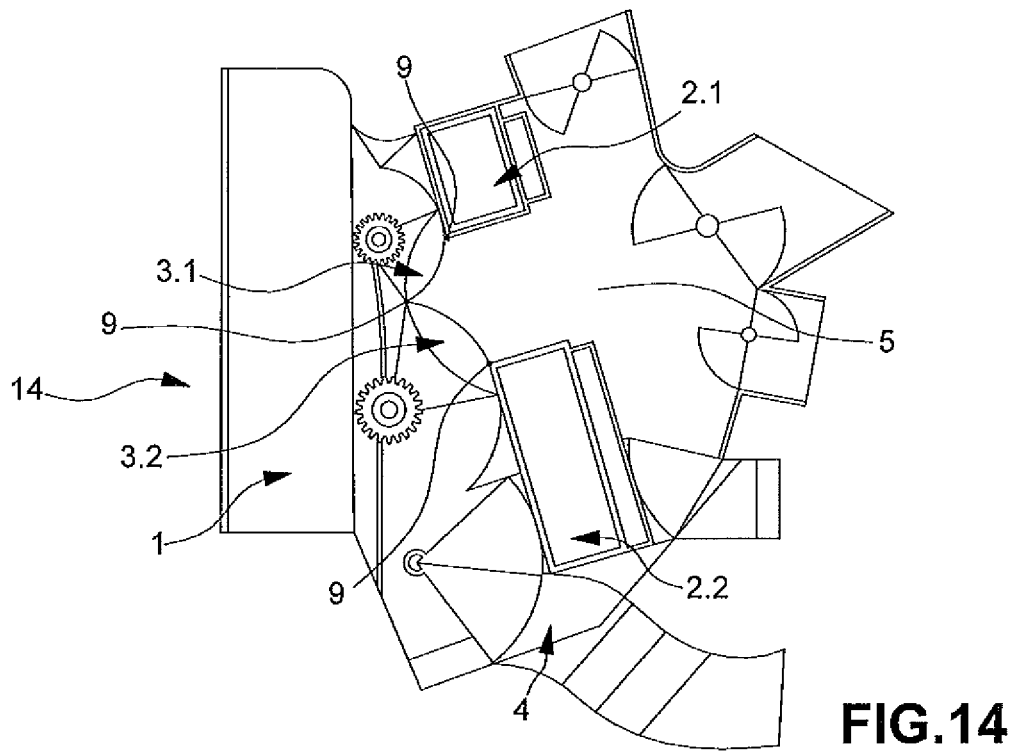
FIG. 14: diagram of a vehicle air conditioner in cross section in the "warmest" end setting.

The second end setting, the "warmest" setting, with a closed cold-air passage and inner air path 5, is thus depicted in FIG. 14. The two pivoting flaps 3.1, 3.2 seal jointly and each partially the inner air path 5 and thus the cold-air passage through the heating heat exchanger 2. Elastic sealing elements 9 seal between the flaps.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS

1 Evaporator
2 heating heat exchanger
2.1 upper heating heat transfer element
2.2 lower heating heat transfer element
3 control element
3.1 upper slider element or swiveling flap
3.2 lower slider element or swiveling flap
4 housing
5 inner air path or cold air passage
6 driving toothed wheel
7 guide or guide rail
8 flap element
9 sealing element
10 upper outer air path
11 lower outer air path
12 air passage or gap
13 toothed bar
14 air flow direction—cool air
15 drive shaft
16 pivoting axis

What is claimed is:

1. A vehicle air conditioner for heating and cooling air, the vehicle air conditioner comprising:
   a first outer air path with air flowing at a first temperature;
   a second outer air path with air flowing at the first temperature;
   a first inner air path with air flowing at a second temperature;
   a first control element controlling the air flowing in the first outer air path, the second outer air path, and the first inner air path; and
   a second control element controlling the air flowing in the first outer air path, the second outer air path, and the first inner air path, wherein the first control element and the second control element are configured jointly to be able to move in opposing directions, wherein the first control element and the second control element are slider elements placed in differing planes to each other and are configured to be movable, one behind the other, in a direction of the air flow, and the slider elements include curved toothed bars, wherein the slider elements and the curved toothed bars are configured curved with opposite orientation.

2. The vehicle air conditioner according to claim 1, wherein each of the slider elements is configured to be drivable through a driving toothed wheel corresponding therewith.

3. The vehicle air conditioner according to claim 2, wherein a central driving toothed wheel is provided as the driving toothed wheel.

4. The vehicle air conditioner according to claim 2, wherein the driving toothed wheel is configured as a coaxial dual toothed wheel with differing numbers of teeth, and that to each of the toothed bars of the slider elements, a driving toothed wheel of the dual toothed wheel is assigned.

5. A vehicle air conditioner for heating and cooling air, the vehicle air conditioner comprising:
   a first outer air path with air flowing at a first temperature;
   a second outer air path with air flowing at the first temperature;
   a first inner air path with air flowing at a second temperature;
   a first slider element controlling the air flowing in the first outer air path, the second outer air path, and the first inner air path; and
   a second slider element controlling the air flowing in the first outer air path, the second outer air path, and the first inner air path, wherein the first slider element and the second slider element are configured jointly to be able to move in opposing directions, and each of the slider elements have a toothed bar and are configured to be drivable through a driving toothed wheel corresponding therewith, wherein the driving toothed wheel is configured as a coaxial dual toothed wheel with differing numbers of teeth, and that to each of the toothed bars of the slider elements, a driving toothed wheel of the dual toothed wheel is assigned.

6. The vehicle air conditioner according to claim 5, wherein the first slider element and the second slider element are placed in differing planes to each other and are configured to be movable, one behind the other, in a direction of the air flow.

7. The vehicle air conditioner according to claim 6, wherein each slider element has two spaced apart toothed bars with two spaced apart driving toothed wheels disposed on a drive shaft to move the slider elements.

8. The vehicle air conditioner according to claim 6, wherein a cold air passage is formed between the slider elements.

9. The vehicle air conditioner according to claim 8, wherein the slider elements have sealing elements that in an end setting of the slider elements close and seal the cold air passage formed between the slider elements and the first inner air path.

10. The vehicle air conditioner according to claim 6, wherein a contour of the slider elements forms a nozzle-shaped constriction toward the first inner air path when the slider elements are disposed in the first outer air path and the second outer air path.

11. The vehicle air conditioner according to claim 6, wherein one of the slider elements includes sealing elements which in an end setting of the one of the slider elements closes and seals the first inner air path.

12. The vehicle air conditioner according to claim 6, wherein the slider elements are plates with curved surfaces.

13. The vehicle air conditioner according to claim 6, wherein the slider elements include curved toothed bars.

14. The vehicle air conditioner according to claim 13, wherein the slider elements and the curved toothed bars are configured curved with opposite orientation.

15. The vehicle air conditioner according to claim 14, wherein the slider elements and the curved toothed bars are so configured that by means of the motion of the slider elements, a linear temperature control is provided.

* * * * *